United States Patent [19]
Gallios

[11] Patent Number: 4,475,149
[45] Date of Patent: Oct. 2, 1984

[54] RESONANT CURRENT-DRIVEN POWER SOURCE

[75] Inventor: George C. Gallios, Setauket, N.Y.

[73] Assignee: Venus Scientific Inc., Farmingdale, N.Y.

[21] Appl. No.: 417,465

[22] Filed: Sep. 13, 1982

[51] Int. Cl.³ .................................................. H02M 3/335
[52] U.S. Cl. ........................................ 363/17; 363/132
[58] Field of Search ................... 363/41, 17, 98, 132

[56] References Cited

U.S. PATENT DOCUMENTS 3,697,855  10/1972  Kernick et al. ...................... 363/41

FOREIGN PATENT DOCUMENTS 0081302  6/1983  European Pat. Off. .
2057168  3/1981  United Kingdom .

OTHER PUBLICATIONS

IBM Technical Disclosure Bulletin, "DC-to-DC Power Converter", Q. L. Benedict et al., vol. 23, No. 5, Oct. 1980, pp. 1780-1783.
"A 95-Percent Efficient 1-kw DC Converter with an Internal Frequency of 50 kHz", Francisc C. Schwarz & J. Ben Klaassens, IEEE Transactions on Industrial Electronics and Control Instrumentation, vol. IECI-25, No. 4, Nov. 1978.

Primary Examiner—William M. Shoop
Attorney, Agent, or Firm—Ostrolenk, Faber, Gerb & Soffen

[57] ABSTRACT

A resonant current-driven power source is disclosed. Preferably, the power source is a DC to DC converter regulator including an inductor and capacitor electrically coupled to one another and an input inverter which converts an input DC voltage into an AC voltage having substantially no DC component and applies the AC voltage across the inductor and capacitor in a manner which causes the inductor and capacitor to resonate with one another whereby an AC voltage appears across the capacitor. An output circuit converts the AC voltage appearing across the capacitor into a DC output voltage. A control circuit is provided for controlling the operation of the inverter circuit in a manner which controls the magnitude of the output voltage.

25 Claims, 10 Drawing Figures

RESONANT CURRENT-DRIVEN POWER SOURCE

BACKGROUND OF THE INVENTION

1. Field of the Invention

The present invention is directed towards a power source and, more particularly, to a resonant current-driven power source. In the presently preferred embodiment, the power source is constructed as a DC to DC converter regulator. The power source can also be constructed as a DC to AC inverter.

2. Description of the Prior Art

Figure 1:
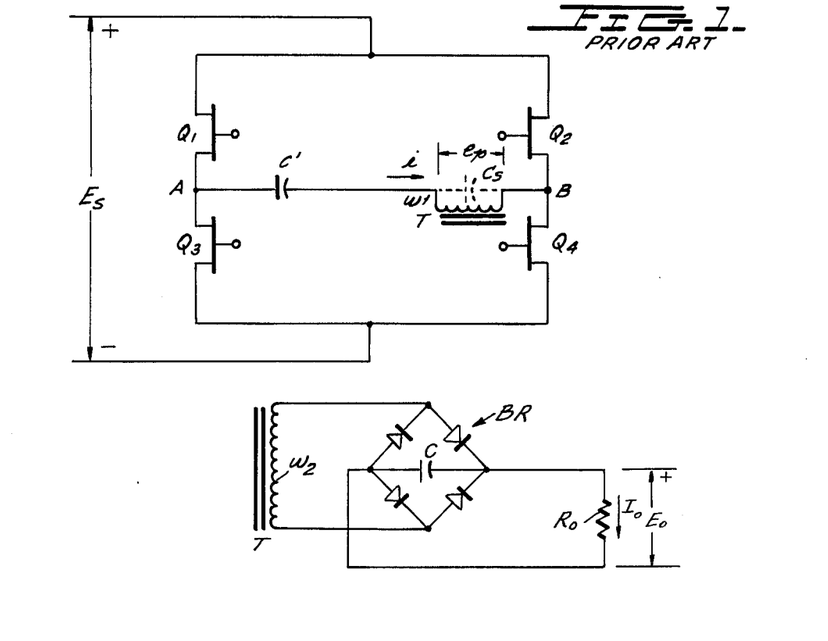
FIG. 1 is a circuit diagram of a voltage-driven converter of the prior art.

Converters of the prior art fall into two primary categories: voltage-driven converters and current-driven converters. A typical voltage-driven converter is illustrated in FIG. 1. As shown therein, the converter comprises four switching transistors Q1–Q4 which are connected between a source voltage Es and the primary winding W1 of a transformer T. A control circuit (not shown) applies inverse square waves to transistors Q1–Q4 so as to operate the transistors in a saturated square wave power "chopper" mode. In this mode, transistor pairs Q1, Q4 and Q2, Q3 are alternately turned on and off so as to induce an AC voltage across the primary winding of transformer T. Particularly, transistors Q1 and Q4 are initially driven into saturation while transistors Q2 and Q3 are turned off so that a current flows through the primary winding W1 of transformer T in the positive direction of current i. Thereafter, transistors Q1 and Q4 are turned off and transistors Q2 and Q3 are driven into saturation with the result that a current flowing in the opposite direction from that of current i will flow through the primary winding W1 of transformer T. The effect of the foregoing is to convert the DC supply voltage Es to an AC voltage ep with a peak-to-peak value of approximately 2Es. The AC voltage across the primary winding of transformer T induces a stepped up or stepped down voltage (depending upon the turns ratio of tranformer T) across the secondary winding W2 of transformer T. This induced voltage is applied across the full wave bridge rectifier BR so as to charge capacitor C to the desired output lever Eo.

Since there is no resistance in the charging path to capacitor C, capacitor C acts as a peak detector and stores a voltage Eo which is determined only by the voltage ep across the primary winding W1 of transformer T and the turns ratio of transformer T. As such, the output voltage Eo of the voltage converter of FIG. 1 is related to the input supply voltage Es by a constant ratio. This makes it impossible to electronically change the input to output voltage ratio and prevents the voltage-driven converter circuit from varying the output voltage (for a given source voltage) from compensating for variations in line voltage, or for variations due to load regulation. As such, the voltage-driven converter cannot operate as a regulator.

As shown in FIG. 1, an equivalent capacitance Cs appears across the primary winding W1 of transformer T. This capacitor represents both the stray capacitance across the primary winding W1 and the reflected stray capacitance across the secondary winding W2 of transformer T. The alternating square wave AC voltage appearing across points A and B in FIG. 1 cause an AC current i to flow in the capacitance Cs which results in a significant volt-ampere load which must be dissipated in the switching transistors Q1–Q4. This loss is one of the major factors limiting the efficiency and operating frequency of a voltage-driven DC/DC converter, especially for high voltage converters where Cs tends to be large.

Due to the practical constraints in the timing of the switching wave forms applied to transistors Q1–Q4 and possible variations in the switching times of the transistors, the voltage between points A and B will have a small but significant DC component. Since there is minimal DC resistance across the primary winding W1 of transformer T, even a low DC voltage across points A and B can result in a high DC current to flow through the primary winding W1 of transformer T. This current can easily saturate transformer T and thereby degrade the operation of the converter circuit. To avoid this problem, prior art regulators typically place a capacitor C' in series with the primary winding W1 of transformer T. While this capacitor prevents saturation of the transformer, it increases the size and cost of the converter circuit.

Figure 2:
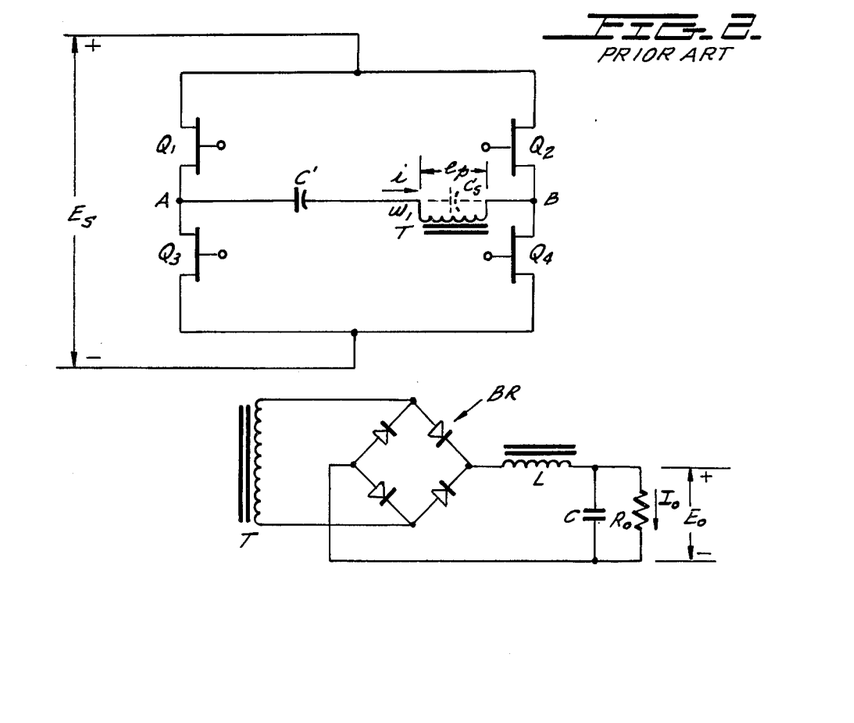
FIG. 2 is a circuit diagram of a current-driven converter regulator of the prior art.

In an effort to overcome some of the shortcomings of the voltage-driven converter, the prior art has developed various current-driven inverters, a typical example of which is illustrated in FIG. 2. In this circuit, the charging capacitor C has been removed from the diode bridge BR and placed across the output load Ro. An inductor L has been placed in series with the capacitor C and forms an integrating circuit in the output path of diode bridge BR. As such, the magnitude of the output voltage Eo can be modified by modifying the duration of the circuit pulses produced by diode bridge Br. The duration of the pulses can, in turn, be controlled by controlling the duty cycle of the driving pulses applied to transistors Q1–Q4. In this manner, the current-driven converter can operate as a regulator.

The primary drawbacks of the prior art current-driven DC/DC converter are as follows. Initially, the integrating inductor L must be large (and therefore expensive) since it must accommodate all of the DC current and store enough energy at all operating currents to maintain continuous output current flow. Furthermore, its resistance must be adequately low to avoid efficiency degrading losses and thermal problems.

In addition to the foregoing, the efficiency reducing volt-ampere losses across equivalent capacitor Cs are essentially the same as those of the voltage-driven converter of FIG. 1 and a filter capacitor C' must again be placed in series with the primary winding W1 of transformer T to protect the transformer from the DC voltage across points A and B.

In most practical applications, the converter circuit of FIG. 2 is operated between 20% and 100% of the rated load. This circuit is not normally operated below 20% of the rated load since this would require a larger and more expensive inductor to store the necessary energy at the lower currents. In order to avoid the need for a larger inductor, a bleeder resistor is sometimes connected across the capacitor C to provide the minimum current of 20% of rated load. This resistor, however, causes undesirable losses in the circuit.

BRIEF DESCRIPTION OF THE INVENTION

In accordance with a preferred embodiment of the present invention, the power source comprises:

an LC circuit including an inductor and a capacitor electrically coupled to one another; said LC circuit having a resonant frequency determined by said inductor and capacitor;

a switching circuit for switching current flow through said LC circuit at a switching frequency which is lower than said resonant frequency, said switching circuit permitting current flow through said LC circuit only in a single direction during each half cycle of said switching frequency;

a transformer having a primary and a secondary winding; said capacitor being coupled only in parallel with said primary winding;

an output circuit coupled to said secondary winding for applying power to a load;

a power input circuit for applying a DC voltage of appropriate polarity to said LC circuit during a portion of each half cycle of said switching frequency, the polarity of said DC voltage being reversed for each successive half cycle of said switching frequency so as to aid the current flow through said LC circuit; and a control circuit for controlling the operation of said power input circuit by adjusting the portion of each said half cycle during which said DC voltage is applied to said LC circuit so as to adjust the output voltage applied to said load. causes said inductor and capacitor to resonate with one another whereby an AC voltage appears across said capacitor; and an output circuit for converting said AC voltage appearing across said capacitor into a DC output voltage.

The most significant design change incorporated in the present invention is the introduction of the induction element into the AC arm of a four element transistor bridge defining the input inverter circuit. This eliminates DC flux in the inductor with the exception of unbalanced currents and allows a substantial reduction in the size and rating of the inductor. By providing the inductive element in the AC arm of the inverter circuit, the effect of reactive loads are minimized and the inverter can be readily controlled from the maximum output level down to no load by proper pulse width modulation of the transistors defining the inverter circuit.

In the preferred embodiment, the converter circuit includes a four element transistor bridge, the top and bottom nodes of which receive the source voltage and the left and right nodes of which apply an AC current across the LC resonant circuit. The two lower transistors receive respective square waves which are inverted with respect to one another and which have a frequency $fs=1/Ts$ which defines the frequency of the AC voltage appearing across the LC circuit.

The two upper transistors receive respective pulse width modulated control signals which are inverted with respect to one another and which turn each of the two transistors on during only a portion of a respective half cycle of the switching period Ts. A diode bridge is connected across the capacitor of the LC resonant circuit and transfers energy to an output capacitor located between two nodes of the diode bridge. Whenever the voltage across the resonant capacitor rises to a level equal to that of the power supply output voltage Eo, energy is transformed from the resonate circuit to the output capacitor. By selecting the resonant frequency of the LC circuit to be substantially higher (e.g., two and one-half times) than the switching frequency fs of the two lower transistors, it is possible to control the amount of current supplied to the output capacitor by varying the duty cycle of the pulse applied to the two upper transistors of the transistor bridge. Particularly, the duty cycle of the control pulses applied to the upper transistors varies the magnitude and duration of charging current applied to the output capacitor located in the diode bridge and thereby controls the level of the output voltage Eo. This "product" control of pulse duration and amplitude provides excellent regulation at any current within the device's maximum current capability.

The current through the LC circut has a wave shape which approximates a trapezoid and an output characteristic approximating a constant current source. Since the output circuit is effectively being driven by a constant current course, it is intrinsically capable of being shortcircuited on the output.

The efficiency of the converter regulator of the present invention is in the order of 90% thereby reducing its size and simplifying thermal management. Because of the high efficiency of the present invention, and the ability to use a relatively small inductor, a circuit which is designed to supply 390 volts at 16 ma and 1800 volts at 270 ma has been found to hve an output density of 16.4 watts per cubic inch.

BRIEF DESCRIPTION OF THE DRAWINGS

For the purpose of illustrating the invention, there is shown in the drawings several embodiments which are presently preferred, it being understood, however, that the invention is not limited to the precise arrangements and instrumentalities shown.

DETAILED DESCRIPTION OF THE PREFERRED EMBODIMENT

Figure 3A:
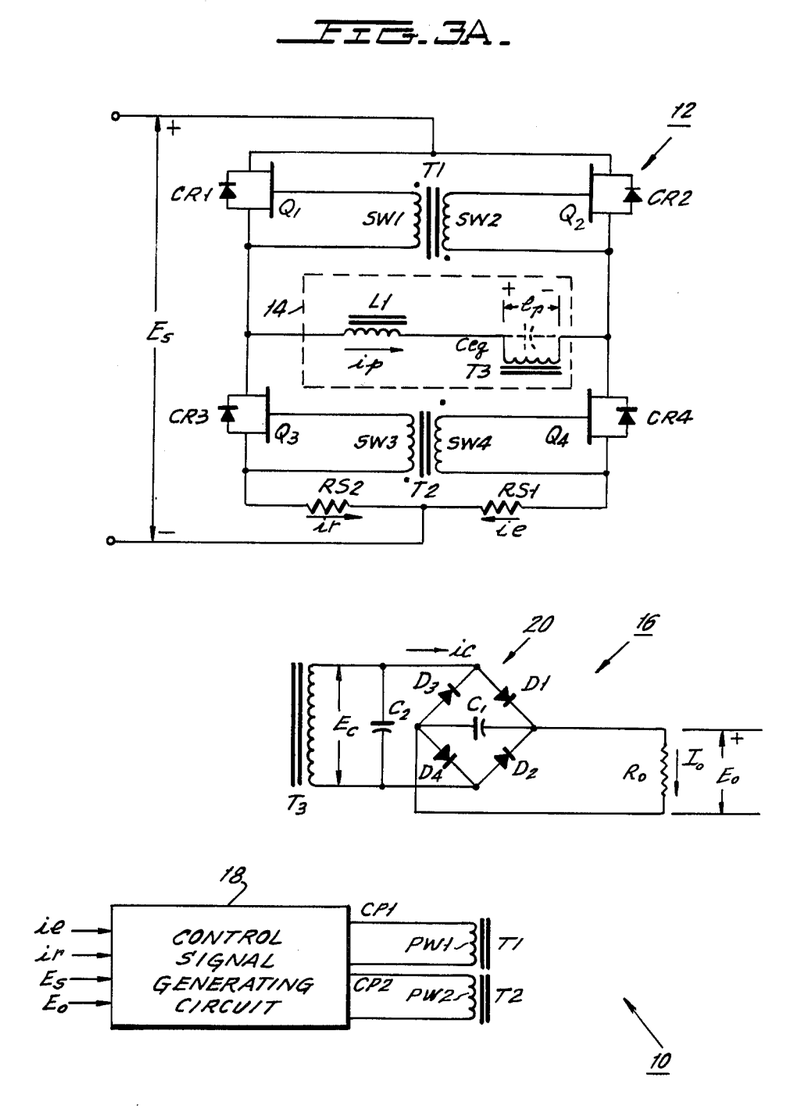
FIG. 3A is a circuit diagram of a resonant current-driven DC/DC converter regulator in accordance with the principles of the present invention.

Referring now to FIGS. 3–7, wherein like numerals indicate like elements, there is shown in FIG. 3A a resonant current-driven DC/DC converter regulator constructed in accordance with the principles of the present invention and designated generally as 10. Power source 10 includes an input inverter circuit 12 which converts a DC input signal Es into an AC signal, an LC circuit 14, across which the AC signal is applied, and an output circuit 16 which converts an AC voltage appearing across the primary winding W1 of transformer T3 into a DC voltage Eo.

While input inverter circuit 12 may take any form desired, it preferably includes four high-speed mosfet transistors Q1–Q4, each of which inherently includes a respective substrate diode CR1–CR4 across its drain and source. While field effect transistors are preferred for reasons noted below, any other type of switching transistor may be utilized. In such a case, discrete diodes must be used in lieu of the substrate diodes CR3–CR4 (diodes CR1 and CR2 are not necessary to the proper operation of the circuit).

Figure 7:
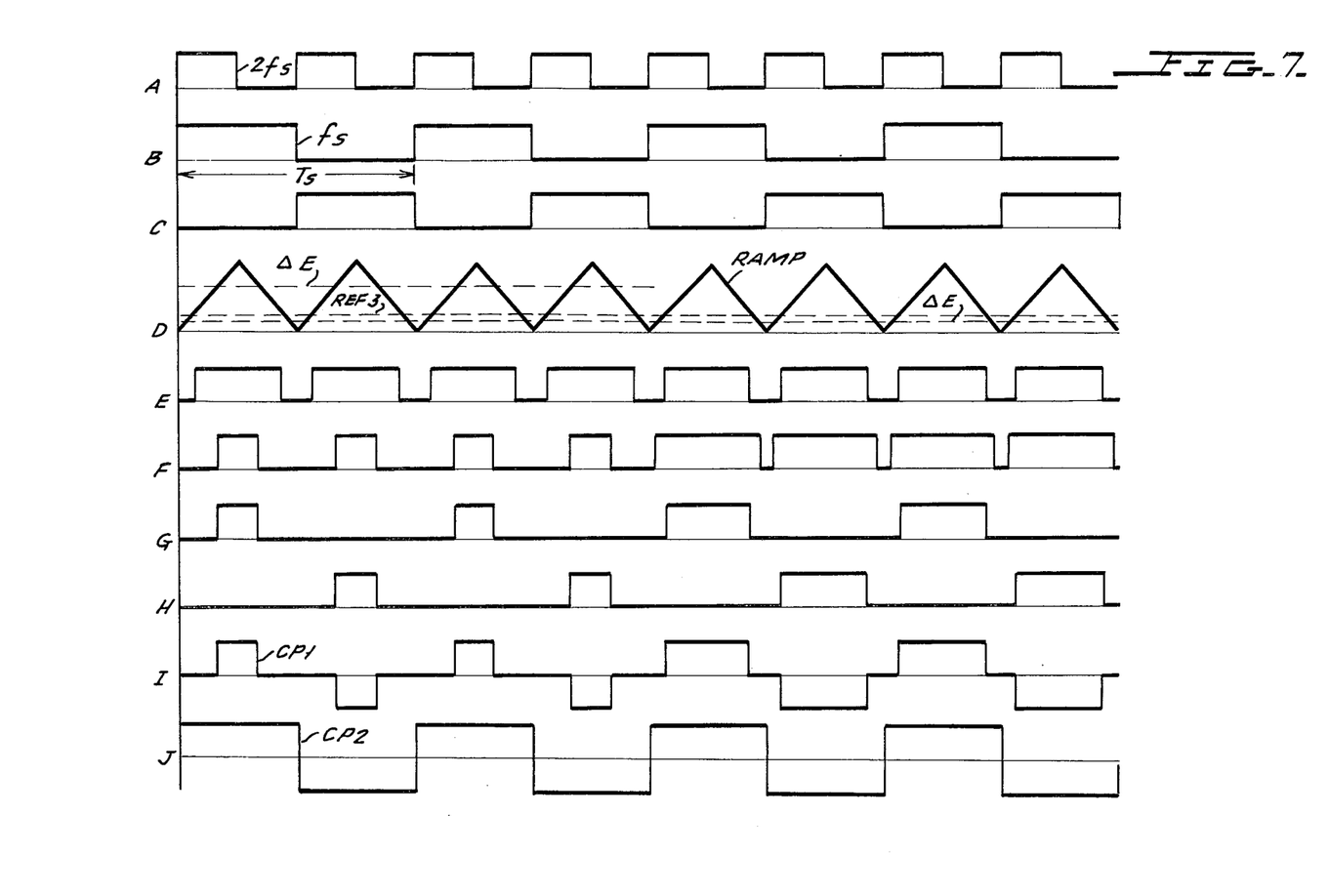
FIG. 7 is a graph illustrating a plurality of wave forms on a common time line, which wave forms appear in various points in FIG. 6.

The switching operation of transistors Q1–Q4 is controlled by a control signal generating circuit 18 whose structure is shown in FIG. 7 and will be described in some detail below. It is sufficient at this point to note that control signal generating circuit 18 generates control signals CP1, CP2 which are applied to the primary windings of transformers T1 and T2, respectively, and control the operation of transistors Q1–Q4.

The gates of transistors Q1 and Q2 are connected to respective secondary windings SW1, SW2 of transformer T1, which windings have a reverse polarity as shown. As a result, a positive going pulse applied to the primary winding PW1 of transformer T1 turns transistor Q1 on and transistor Q2 off while a negative pulse applied to the primary winding PW1 of transformer T1 turns transistor Q2 on and transistor Q1 off.

The gate of transistors Q3 and Q4 are connected to respective secondary windings SW3, SW4 of a second transformer T2, which windings have a reverse polarity as shown. As a result, transistor Q4 will be turned on and transistor Q3 will be turned off by a positive pulse applied to the primary winding PW2 of transformer T2 while transistor Q3 will be turned on and transistor Q4 will be turned off by a negative pulse applied to the primary winding PW2 of transformer T2.

Figure 4:
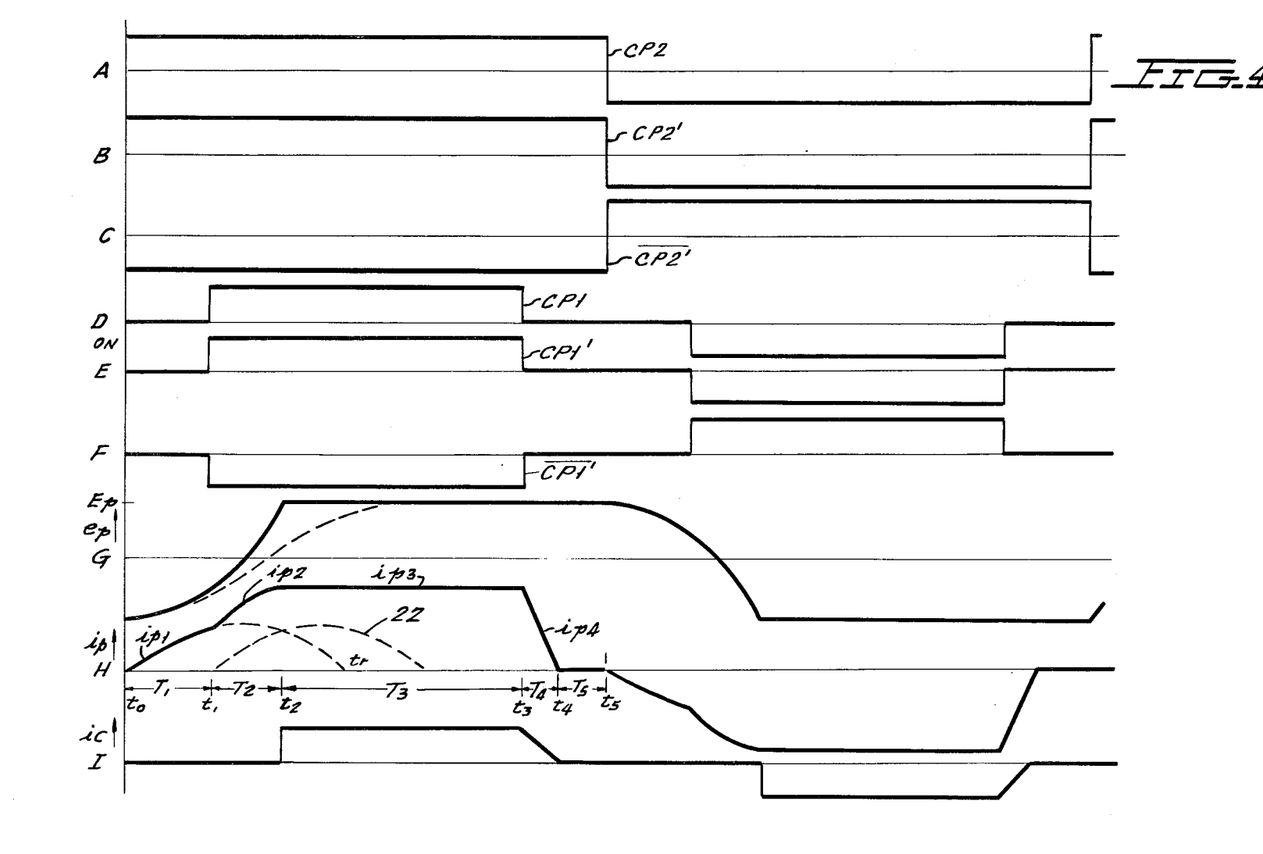
FIG. 4 is a graph illustrating a series of wave forms on a common time line, which wave forms are used to describe the operation of the circuit of FIG. 3A.

The control signal CP2 takes the form illustrated in line A of FIG. 4. As shown therein, control signal CP2 is a square wave having a period Ts and a frequency fs=1/Ts. This frequency is the switching frequency of transistors Q3 and Q4 and defines the frequency of the AC wave form appearing across the primary winding of transformer T3.

The control signal CP2 is applied to the primary winding PW2 of transformer T2 and induces control signals $\overline{CP2'}$ and CP2' in the secondary windings SW3 and SW4, respectively, of transformer T2. These signals are applied to the respective gates of transistors Q3 and Q4 and turn these transistors on during alternate half periods of the switching cycle.

The control signal CP1 takes the general form illustrated in line D of FIG. 4 and includes a positive going pulse during a portion of the first half of each period Ts and a negative going pulse during a portion of the second half of each period Ts. As will be explained in greater detail below, the duration and position with respect to control signal CP2 of each positive and negative going pulse of the control signal CP1 is varied by control circuit 18 to regulate the magnitude of the output voltage Eo. The control signal CP1 is applied to the primary winding PW1 of transformer T1 and induces control signals CP1' and $\overline{CP1'}$ in the secondary windings SW1, SW2, respectively, of transformer T1. These control signals are applied to respective gates of transistors Q1 and Q2 and cause transistors Q1 and Q2 to turn on during selected portions of alternating half cycles of the switching period Ts. As will be described in greater detail below, the timing of the leading and trailing edges of each pulse CP1', $\overline{CP1'}$ controls the magnitude and duration of current pulses applied to output capacitor C1 of output circuit 16 and thereby controls the magnitude of the output voltage Eo.

LC circuit 14 defines a resonant circuit having a resonant frequency fr which is greater than the switching frequency fs defined by control signal CP2. The resonant frequency fr is preferably approximately 2½ times the switching frequency fs and may be defined as:

$$fr = \frac{1}{2\pi \sqrt{L1\ Ceq}} \qquad \text{(Eq. 1)}$$

wherein L1 is the inductance of inductor L1 and Ceq is the capacitance of the equivalent capacitor Ceq appearing across the primary winding of transformer T3. Equivalent capacitor Ceq is defined by the stray capacitance on both the primary and secondary windings of transformer T3 and any capacitance appearing in the output circuit 16 on the transformer side of rectifier bridge 20 which is reflected back to the primary winding of transformer T3. Since the stray capacitance alone is not normally sufficiently high to cause the resonant frequency fr to reach the desired value, a capacitor C2 is placed across the secondary winding of transformer T3. This capacitor is reflected to the primary winding of transformer T3 and forms part of the equivalent capacitance Ceq. Obviously, capacitor C2 may be placed across the primary winding of transformer T3.

The operation of power circuit 10 can best be understood with reference to the wave forms of FIG. 4 and to the circuit diagrams of FIGS. 3A–3D. At the beginning of each switching cycle (at time to of FIG. 4), capacitor Ceq is charged to −Ep volts where:

$$Ep = \frac{1}{N} Eo \qquad \text{(Eq. 2)}$$

and N is the turns ratio of transformer T3.

Figure 3B:
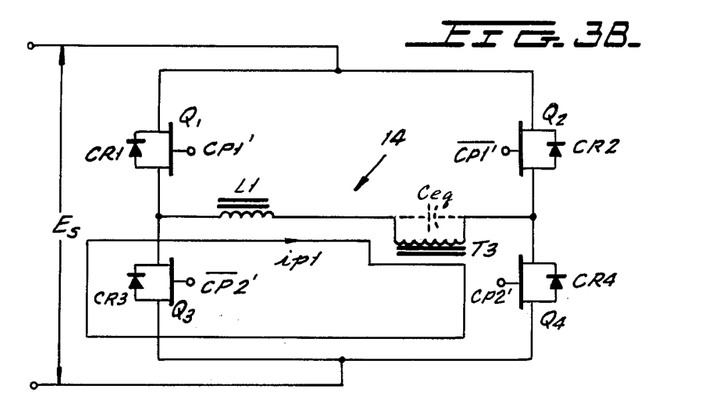
FIGS. 3B–3D are circuit diagrams of the input portion of the circuit of FIG. 3A and illustrate the current flow through this circuit during various portions of the transistor switching cycle.
Figure 3C:
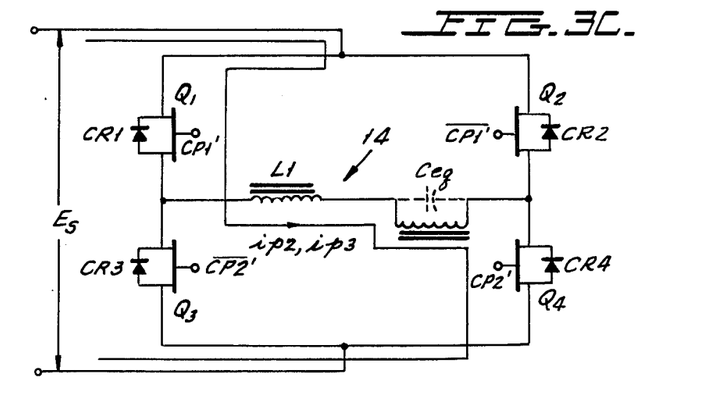

During the first portion of this half cycle of the switching period Ts, the control signals CP2', CP2' are applied to respective gates of transistors Q4, Q3 thereby driving transistor Q4 into saturation and shutting transistor Q3 off. In this condition, the charge across capacitor Ceq causes a resonant current ip1 to flow through inductor L1, substrate diode CR3 and transistor Q4 in the direction shown in FIG. 3B. This resonant current flows towards a maximum value:

$$ip1_{max} = \frac{Ep}{Zo} \qquad \text{(Eq. 3)}$$

wherein Zo is the impedance of LC circuit 14 and is defined as:

$$Zo = \sqrt{L1/Ceq} \qquad \text{(Eq. 4)}$$

The resonant current will rise toward $ip1_{max}$ at the resonant frequency fr defined in equation (1), supra. Simultaneously, the voltage across capacitor Ceq will begin rising from −Ep towards +Ep. At time t1 (see FIG. 4), control signal CP1' is applied to the gate of transistor Q1 causing transistor Q1 to turn on. This enables the current ip2 to flow through the path illustrated in FIG. 3C and effectively adds another step function having a magnitude Es to the LC circuit 14. As a result, a second resonant current illustrated by dash lines 22 in line H of FIG. 4 will be added to the LC circuit 14. This causes the current ip2 to rise at a faster rate towards $2ip1_{max}$ and causes the voltage $e_p$ across capacitor Ceq to rise at a faster rate toward the value 2Es+Ep. See lines G and H of FIG. 4.

At time t2, the voltage across capacitor Ceq will reach the value Ep at which diode bridge 20 turns on. Once diode bridge 20 begins conducting, the charging capacitor C1 is reflected back across the primary winding of transformer T3. Since the capacitance of capacitor C1 is substantially greater than the equivalent capacitor Ceq, substantially all of the current Ip3 through inductor L1 flows through the primary winding of transformer T3. This current will induce a charging current ic (see line I of FIG. 4) in the secondary winding of transformer T3. The charging current is applied both to the load Ro and to the charging capacitor C1. This current will be integrated by capacitor C1 and will charge capacitor C1 to the desired output value Eo.

Assuming that the source voltage Es and the output voltage Eo remain constant (except for ripple voltage) during the half period of the switching cycle, the voltage across capacitor Ceq will remain at a constant value Ep and all the energy (less circuit losses) flowing through inductor L1 will be transferred to charging capacitor C1 and the load Ro. As long as the voltage across capacitor Ceq remains at Ep and current continues to flow through inductor L1, energy will be transferred to capacitor C1.

Figure 3D:
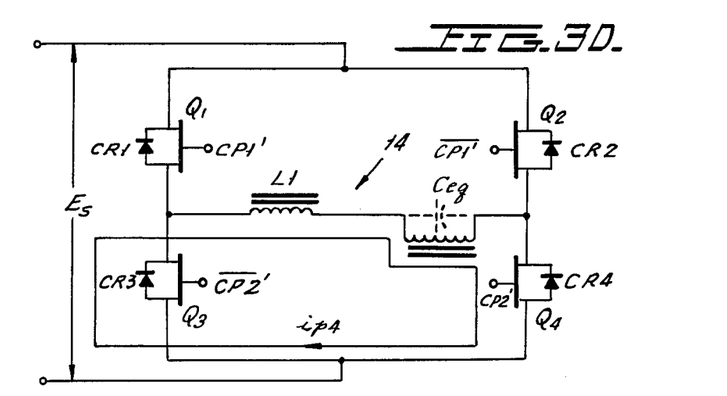

At time t3, the control signal CP1' applied to the gate of transistor Q1 drops to 0 thereby turning transistor Q1 off. At that point, the current ip4 continues to flow through transistor Q3 and substrate diode CR4 as illustrated in FIG. 3D and in line H of FIG. 4. During this period, all of the energy in inductor L1 is transferred to the load Ro and to charging capacitor C1 at a decay rate of Ep/L1. When current ip4 reaches 0, substrate diode CR3 prevents the current ip from reversing thereby stopping the current flow. This, in turn, causes diode bridge 20 to stop conducting and the charging current ic falls to 0. See line I of FIG. 4. There is then a dead period T5 during which no current flows through inductor L1.

During this inverval, the voltage across capacitor Ceq remains at Ep. This is the only energy left stored in the circuit and is used to reverse the polarity of the voltage across capacitor Ceq during the first portion of the next half cycle of the switching period Ts during which the transistor Q3 is on and the remaining transistors are off. See line G of FIG. 4. The operation of the converter circuit during the second half of each switching period Ts is identical to that of the first half of the cycle except the transistors Q2 and Q3 are turned on and the wave forms are inverted as shown in FIG. 4.

Among the advantages of the present invention over prior art current driven DC/DC converters is the fact that the integrating inductor L1 is located in an AC branch of the circuit and is not required to carry any substantial DC current. Additionally, by properly designing the control signal generating circuit 18, the input inverter circuit 12 can be operated in such a manner that substantially no DC current flows through inductor L1. Since inductor L1 need not carry any substantial DC current, its size and cost can be substantially reduced compared to the integrating inductor L of the prior art.

Another advantage of the converter circuit 10 of the present invention lies in the fact that the resonating circuit itself reverses the polarity of the voltage ep across the primary winding of transformer T3 during alternate half cycles. In prior art circuits, the volt-ampere supplied by the switching transistors to reverse the polarity of the charge on the stray capacitors which are reflected across the primary winding of transformer T3 created substantial losses which are at least partially avoided by the present invention.

The current driven operation serves to minimize the transient switching current required from the transistors Q1-Q4 and results in wave forms at the output rectifiers D1-D4 which have very slow rise and fall time transition for the switching frequency fs. The lower transient switching currents in the output rectifiers minimize switching losses and thereby maximize efficiency. Low switching transients and associated lower losses also permit a higher frequency of operation. This makes it possible to use faster switching power mosfet transistors which permit further reduction in weight and volume.

Yet another advantage of the present invention resides in the fact that by varying the duty cycle of transistors Q1 and Q2, both the magnitude and duration of the charging current ic can be controlled. This "product" results in good regulation at any current within the device's maximum current capability.

In the control circuit 18 described below, each positive and negative going pulse of the control signal CP1 is symmetrical within its respective half cycle. It should be recognized at this point that the leading edge of the control pulse has a greater effect on the output voltage Eo than does the trailing edge. Thus, the leading edge of the control pulse determines how quickly the voltage ep rises to the maximum value Ep and thereby effects both the magnitude and duration of the charging current ic. The trailing edge of the pulses of control signal CP1 only effects the duration of the charging current ic and does not effect its magnitude.

In view of the foregoing, it would be advantageous to modify the control circuit 18 so that the leading and trailing edges of the control pulses CP1 are independently controlled. The leading edge of the control pulses CP1 would serve as a coarse control for the circuit while the trailing edges would serve as a fine control over the output power. An appropriate modification of the control circuit 18 to serve this function is well within the skill of one of ordinary skill in the art.

Still another advantage of the present invention resides in the fact that the circuit can be operated at from substantially no load to full rated load. Operation at no load can best be understood with reference to FIG. 5. In this mode of operation, control pulses CP1' are delayed until after one-half of the resonating period Tr with the result that a sinusoidal current ip1 will flow in the direction illustrated in FIG. 3B. After one-half of the resonating period Tr, the current ip will attempt to reverse direction but is unable to do so due to the polarity of substrate rectifier CR3 (Q3 is off). During this period, the voltage across capacitors Ceq will rise from −Ep to slightly less than +Ep due to circuit losses. Since the voltage across capacitor Ceq never rises above Ep, diode bridge 20 will never be turned on and no energy will be transferred to the charging capacitor C1. At time t6, the control signal CP1' is applied to the gate of transistor Q1 turning transistor Q1 on for a short interval sufficient to restore circuit losses and bring the voltage across capacitor Ceq up to, but no above, Ep.

Figure 5:
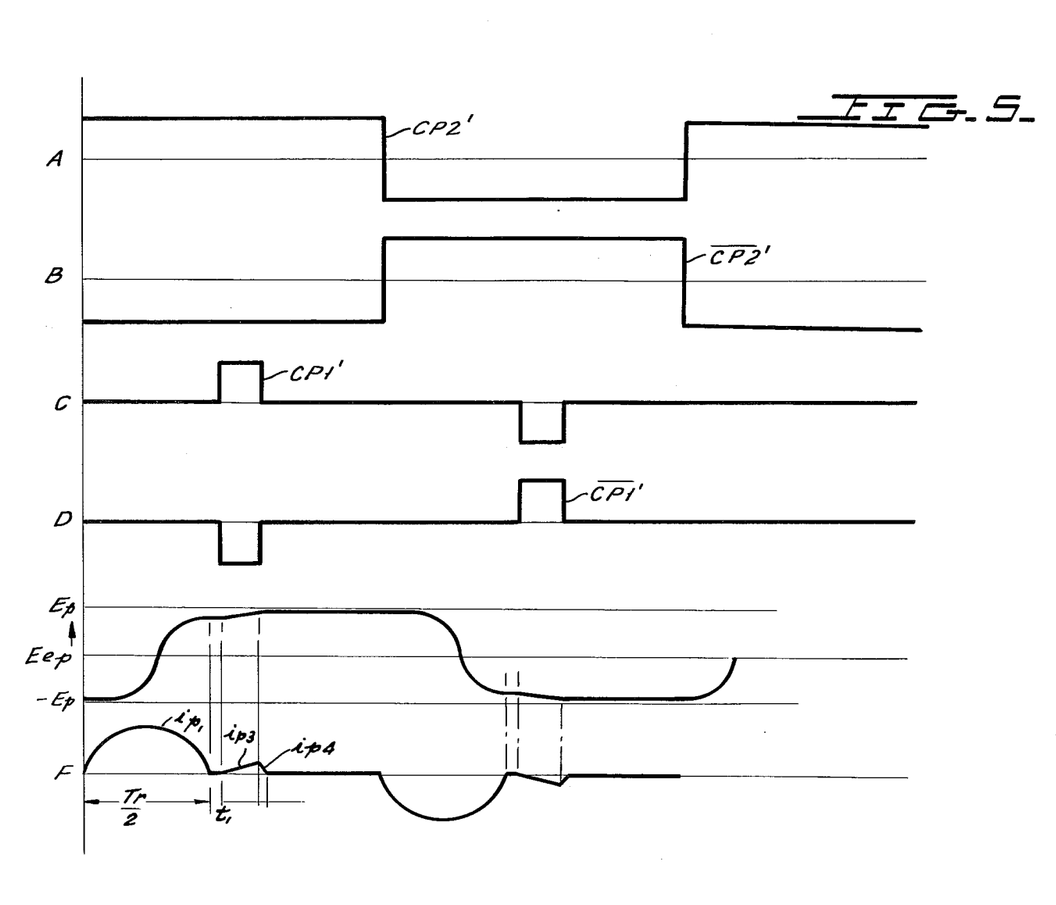
FIG. 5 is a graph illustrating a series of wave forms further illustrating a second mode of operation of the circuit of FIG. 3A.

Circuit operation during the next half cycle of the switching period Ts is the same as but inverse to that during the first half cycle. In this manner, converter 10 is able to operate at no load without the need for any large inductors or bleeder resistors as are required in the prior art.

Where the output voltage Eo required is within an approximate range of one-half to two times the source voltage Es, and where the source voltage Es can float (such as a battery), transformer T3 can be eliminated and replaced with a small value capacitor Ceq. Such a circuit can be used as a lightweight transformerless buck-boost DC/DC converter regulator.

Figure 6:
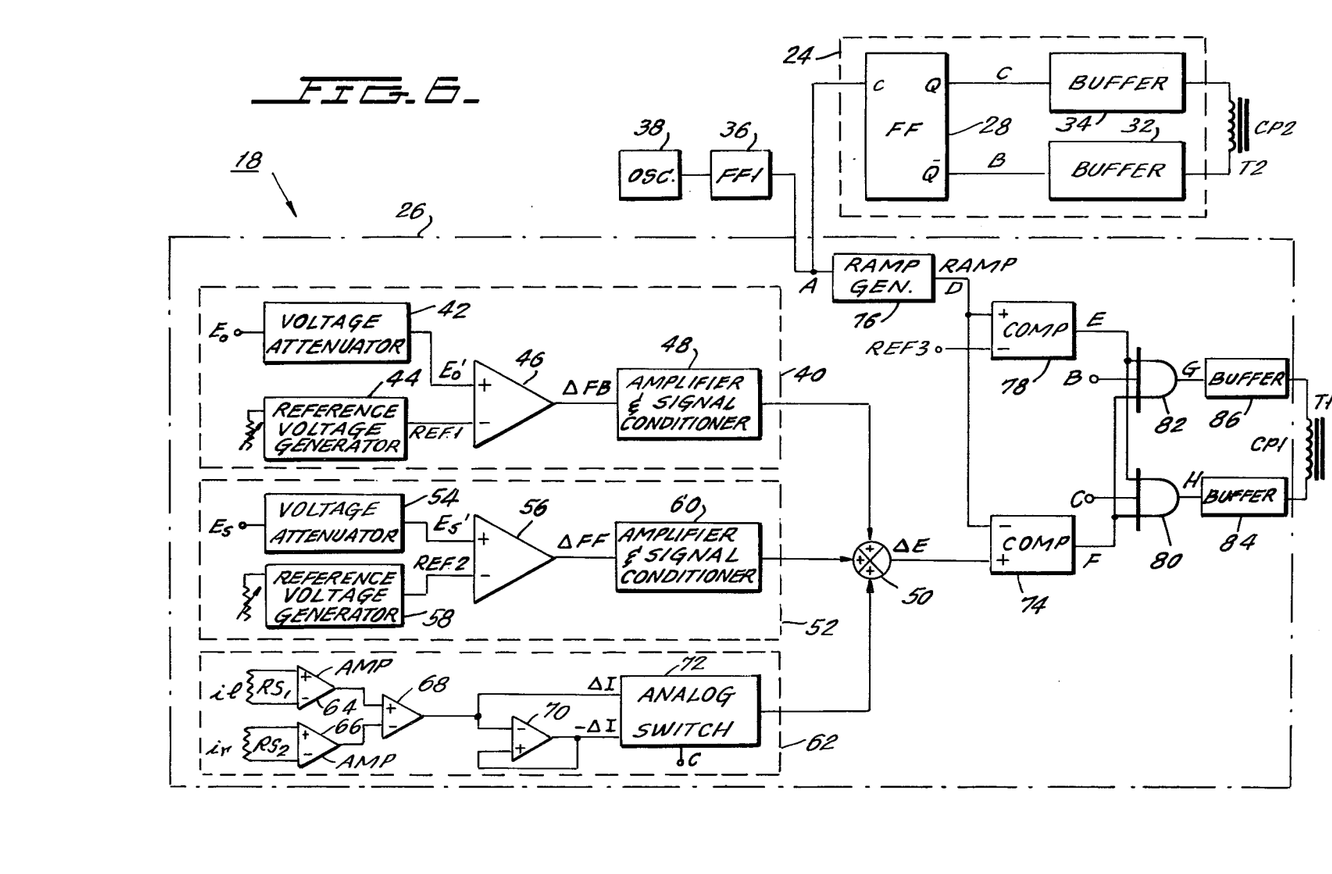
FIG. 6 is a block diagram illustrating the control signal generator circuit of FIG. 3A.

The structure and operation of control signal generating circuit 18 will now be described with reference to FIGS. 6 and 7. As shown in FIG. 6, control signal generator circuit 18 comprises two primary subcircuits: a switching cycle pulse generator circuit 24 and a power control pulse generator circuit 26.

Switching cycle pulse generator circuit 24 generates the control pulse CP2 which defines the switching period of transistors Q3, Q4 (and thereby the frequency of the AC signal through LC circuit 14). Pulse generator circuit 24 includes a flip-flop 28 and a pair of buffer circuits 32, 34 connected to the Q and Q outputs of flip-flop 28, respectively. The clock input of flip-flop 28 receives a square wave (see line A of FIG. 7) having a frequency 2fs which is generated by flip-flop 36 in response to a square wave generated by oscillator 38 (such as a 555 timer) having a frequency 4fs.

The output of flip-flop 36 is applied to the clock input of flip-flop 28 causing its outputs to switch between the binary high and low values in the manner shown in lines B and C of FIG. 7. The Q and Q output of flip-flop 28 are 180° out of phase, and are applied to buffer circuits 32, 34 (which may be clock drivers sold by National Semiconductor under product designation MH0026). As a result, the control signal CP2 is induced across the primary winding of transformer T2. See line J of FIG. 7.

As noted above, the duty factor of control signal CP1 determines the output power applied to output capacitor C1. In order to properly regulate the output voltage Eo, the duty factor of the control signal CP1 should be increased whenever it is necessary to increase the output voltage Eo and should be decreased when it is necessary to decrease the output voltage Eo. In this manner, control circuit 18 can compensate for load regulation. Additionally, control circuit 18 can ensure that the output voltage Eo remains at the desired level even if the input voltage Es fluctuates. Particularly, control circuit 18 can monitor the level of the input voltage Es and increase or decrease the duty cycle of control signal CP1 in response to falling or rising supply voltages, respectively. Finally, control circuit 18 can also ensure that substantially no DC current flows through LC circuit 14 by monitoring the current during alternate half cycles of the switching period and varying the current flow accordingly.

Control over the output voltage Eo is provided by feedback signal generator circuit 40 which comprises a voltage attenuator 42, a reference voltage generator 44, a difference amplifier 46 and an amplifier and signal conditioner 48. Voltage attenuator 42 receives the output voltage Eo and generates an attenuated signal Eo' which is proportional thereto. This signal is compared to a reference signal REF1 generated by reference voltage generator 44 in difference amplifier 46. The magnitude of the reference voltage REF1 can be manually controlled (such as by a potentiometer) and determines the desired value of the output voltage Eo. In some applications, it will be preferable to reference voltage generator 44 to automatically generate either a constant or varying reference voltage REF1.

Difference amplifier 46 compares the magnitudes of the attenuated voltage signal Eo' and the reference voltage REF1 and generates a feedback error signal ΔFB at its output. The signal is amplified and its frequency response is conditioned by amplifier and signal conditioner 48 whose output is applied to one input of adder 50.

A second input of adder 50 receives the output of feed forward signal generator circuit 52. This circuit monitors the value of the supply voltage Es and compares it to a reference signal indicative of the nominal value of Es and generates an error signal ΔFF indicative of the difference between these values. To this end, feed forward signal generator circuit 52 includes a voltage attenuator 54 which attenuates the supply voltage Es and applies an attentuated voltage Es' to the non-inverting input of difference amplifier 56. The remaining input of difference amplifier 56 receives a second reference voltage REF2 which is generated by voltage generator 58. The magnitude of the reference voltage REF2 may be manually set, such as by a potentiometer, and indicates the nominal value of the source voltage Es.

Difference amplifier 56 compares the signals at its input and generators a feed forward error signal ΔFF which is indicative of the difference between the actual and nominal value of the supply voltage Es. This signal is applied to amplifier and signal conditioner circuit 60 where it is amplified and its frequency response is conditioned and it is then applied to a second input of analog adder 50.

A third input to adder 50 is generated by current sensing control circuit 62 which generates an error signal indicative of the difference between the left and right current il and ir flowing through inductor L1 during alternate half cycles of the switching period Ts. This signal provides an indication of any DC component in LC circuit 14 and is used by control circuit 16 to reduce the DC component toward zero.

To this end, current control sensing circuit 62 includes a pair of difference amplifiers 64, 66 across whose inputs are connected respective sensing resistors Rs1, Rs2. These resistors appear in the bottom lines of the transistor bridge of FIG. 3A and have the current il and ir, respectively, flowing through them. These resistance values are extremely low and, therefore, do not effect the operation of inverter circuit 12. The output of amplifiers 64 and 66 will be respective voltages indicative of the left and right currents il, ir, respectively. These signals are applied to respective inputs of difference amplifier 68 which generates a positive error signal ΔI. This signal is applied to the inverting input of a second amplifier 70 which is connected in the manner shown to operate as an inverting amplifier. As a result, the output of amplifier 70 will be a negative error signal −ΔI.

The positive error signal ΔI must be applied to adder 50 during the first half of each cycle of the switching period ts so as to adjust the duty cycle of the control signal CP1' applied to the gate of transistor Q1. The negative error signal −ΔI must be applied to the adder 50 during the second half cycle of each switching period Ts so as to adjust the duty cycle of the control signal CP1' applied to transistor Q2. To this end, the error signals I and −ΔI are applied to an analog switch 72 which is gated by the signal C appearing at the output of flip-flop 28.

The output of adder 50 is an error signal ΔE which is applied to the non-inverting input terminal of comparator 74 which compares the error signal ΔE to a ramp signal RAMP generated by ramp generator 76. The ramp generator 76 is connected to the output of flip-flop 36 (see line A of FIG. 7) and integrates the square wave appearing at the output of flip-flop 36. As such, the output of ramp generator 68 will integrate to a maximum value during the first half of each half cycle of the switching period and will integrate down to zero during the second half of each half period of the switching period Ts. The resultant wave form is illustrated in line D of FIG. 7.

Comparator 74 compares the error signal ΔE to the ramp signal RAMP and generates a binary high at its output whenever the error signal ΔE is greater than the RAMP signal and a binary low at its output at all other times. See lines D and F of FIG. 7. As will be understood by those of ordinary skill in the art, the error signal ΔE will rise and fall as a function of the required output and the supply voltage. Whenever additional charge must be added to the output capacitor C1 to increase the output voltage Eo to the desired level, the error signal ΔE will go down towards zero thereby increasing the duty factor of the pulses generated by comparator 74. See line F of FIG. 7. As the output voltage increases beyond the desired value, or the source voltage increases above its nominal value, the servo loop will act so as to increase ΔE to thereby decrease the duty cycle of the pulses generated by comparator 74. The foregoing operation is illustrated in lines D and F of FIG. 7 wherein ΔE is initially presumed to be high (indicating that the charge to be added to the output capacitor C1 is to be reduced) and ΔE is thereafter presumed to be low indicating that increased charge must be supplied to the output capacitor C1).

The output of comparator 74 is applied to AND gates 80, 82 which are gated by signals B and C appearing at the output of flip-flop 28. The output of AND gates 80, 82 are applied to buffer ciruits 84, 86, respectively, which may take the same form as buffer circuits 32, 34.

In the preferred embodiment, AND gates 80, 82 also receive the output of comparator 78 which defines a dead time during which the transistors Q1, Q2 must be off. As explained above, this dead time is desired in order to ensure that no current is flowing through inductor L1 at the beginning of each successive half cycle of the switching period Ts. It is preferred that this dead time be approximately 15% of the switching period Ts.

To this end, comparator 78 compares the ramp signal RAMP to a reference voltage REF3 which is illustrated in line D of FIG. 7. As a result, comparator 78 will gate AND gates 80, 82 during all but 15% of each successive half cycle of the switching period Ts.

As long as the error voltage ΔE is greater than the reference voltage REF 3, the pulses appearing at the output of comparator 74 will be narrower than the dead time pulses appearing at the output of comparatory 78. In such a case, the control signal CP1 will not be affected by the dead time pulses. See the first two switching periods of FIG. 7.

Whenever the error signal ΔE falls below the reference signal REF3, the pulses generated by comparator 74 will have a greater pulse width than the dead time pulses generated by comparator 78. As such, the duty cycle of the control signal CP1 will be limited by the dead time pulses. See the last two switching periods of FIG. 7.

In the embodiment disclosed, power source 12 is shown as a DC to DC converter regulator. If desired, the circuit can be modified for operation as a DC to AC inverter. As will be apparent to those skilled in the art, it will then be necessary to substitute the diode bridge with a demodulator in a known manner to produce the desired AC output.

In accordance with the foregoing, the two lower transistors Q3 and Q4, in cooperation with diodes CR3 and CR4 define a switching circuit for switching current flow through the LC circuit 14 at a switching frequency which is lower than the resonant frequency of the LC circuit. Similarly, the upper transistors Q1 and Q2 form a power input circuit for applying a DC voltage of appropriate polarity to the LC circuit 14 during a portion of each half cycle of the switching frequency. The polarity of the DC voltage is reversed for each successive half cycle of the switching frequency such that the DC voltage aids the current flow through the LC circuit 14.

The present invention may be embodied in other specific forms without department from the spirit or essential attributes thereof and, accordingly, reference should be made to the appended claims, rather than to the foregoing specification as indicating the scope of the invention.

What is claimed is:

1. A power source, comprising:
   an LC circuit including an inductor and a capacitor electrically coupled to one another; said LC circuit having a resonant frequency determined by said inductor and capacitor;
   a switching circuit for switching current flow through said LC circuit at a switching frequency which is lower than said resonant frequency, said switching circuit permitting current flow through said LC circuit only in a single direction during each half cycle of said switching frequency;
   a transformer having a primary and a secondary winding; said capacitor being coupled only in parallel with said primary winding;
   an output circuit coupled to said secondary winding for applying power to a load;
   a power input circuit for applying a DC voltage of appropriate polarity to said LC circuit during a portion of each half cycle of said switching frequency, the polarity of said DC voltage being reversed for each successive half cycle of said switching frequency so as to aid the current flow through said LC circuit; and
   a control circuit for controlling the operation of said power input circuit by adjusting the portion of each said half cycle during which said DC voltage is applied to said LC circuit so as to adjust the output voltage applied to said load.

2. The power source of claim 1, wherein said control circuit operates to maintain the output voltage applied to said load at a constant value.

3. The power source of claim 2, wherein said constant value is settable by the operator of said power source.

4. The power source of claim 1, wherein said DC voltage is of constant magnitude and is applied to said LC circuit as a voltage pulse, and wherein said control circuit controls the operation of said power input circuit by adjusting both the duration and position of said voltage pulse with respect to said switching frequency.

5. The power source of claim 1, wherein said control circuit controls the operation of said power circuit in such a manner that said DC voltage is applied to said LC circuit for less than the entire duration of each half cycle of said switching frequency.

6. The power source of claim 1, wherein said switching circuit comprises:
first and second diodes coupled to said LC circuit with opposite polarities such that said first diode permits current flow through said LC circuit in a first direction and said second diode permits current flow through said LC current in a second direction, opposite to said first direction.
first and second electronic switches coupled across said first and second diodes, respectively, each of said electronic switches having a control electrode which turns that switch on or off depending on the state of a control signal applied thereto, each electronic switch short-circuiting its respective diode when it is on; and
said control circuit generating switching control pulses which are applied to said control electrodes of said electronic switches as the control signals therefor so that said switches are alternately turned on and off at the beginning of each half cycle of said switching frequency.

7. The power source of claim 6, wherein said power input circuit comprises third and fourth electronic switches each having a control electrode which turns that switch on or off depending on the state of a control signal applied thereto, said third switch coupling one terminal of said DC source to a first input of said LC circuit, said fourth switch coupling said one terminal of said DC source to a second input of said LC circuit, said control circuit generating first and second power control pulses which are applied to said control terminals of said third and fourth switches, respectively, as the control signals therefor, said control circuit controlling the duration and timing of said first and second power control pulses so as to control the output voltage applied to said load.

8. The power source of claim 1, wherein said power input circuit comprises first and second electronic switches each having a control electrode which turns that switch on or off depending upon the state of a control signal applied thereto, said first switch coupling one terminal of said DC source to a first input of said LC circuit, said second switch coupling said one terminal of said DC source to a second input of said LC circuit, said control circuit generating first and second power control pulses which are applied to said control terminals of said first and second switches, respectively, as the control signals therefor, said control circuit controlling the duration and timing of said first and second power control pulses so as to control the output voltage applied to said load.

9. The power source of claim 1, wherein said capacitor includes both stray capacitance in said primary winding and a reflected capacitance which is reflected to said primary winding from said secondary winding.

10. The power source of claim 9, wherein said reflected capacitance is derived both from stray capacitance in said secondary winding and a discrete capacitor coupled across said secondary winding.

11. The power source of claim 10, wherein said capacitor further includes a discrete capacitor coupled across said primary winding.

12. The power source of claim 9, wherein said capacitor further includes a discrete capacitor coupled across said primary winding.

13. The power source of claim 7, wherein said control circuit independently adjusts the location of the leading and trailing edge of each of said first power control pulses and independently adjusts the location of the leading and trailing edge of each of said second power control pulses.

14. The power source of claim 8, wherein said control circuit independently adjusts the location of the leading and trailing edge of each of said first power control pulses and independently adjusts the location of the leading and trailing edge of each of said second power control pulses.

15. The power source of claim 1, wherein said output circuit includes a rectifier circuit located between said secondary winding and said load and wherein said rectifier circuit conducts and transfers energy from said LC circuit to said load only when the voltage across said capacitor is greater than a value determined by the output voltage across said load.

16. The power source of claim 1, wherein said output circuit further includes an output capacitor which receives charge from said LC circuit when the energy is being transferred to said load.

17. The power source of claim 2, wherein current pulses of opposite polarity flow through said inductor during respective half cycles of said switching frequency and wherein energy is transferred to said capacitor during that portion of each half cycle of said switching frequency during which said rectifier circuit is not conducting and is transferred to said output load during that portion of each half cycle of said switching frequency during which said rectifier circuit is conducting.

18. The power source of claim 4, wherein said control circuit varies the portion of each half cycle of said switching frequency that said DC voltage is applied to said LC circuit so as to vary the magnitude and duration of said current pulses and thereby control the magnitude of said output voltage.

19. A method for regulating a DC voltage in a power source including an LC circuit including an inductor and a capacitor electrically coupled to one another, said LC circuit having a resonant frequency determined by said inductor and capacitor, a transformer having a primary and a secondary winding, said capacitor being coupled only in parallel with said primary winding, and an output circuit coupled to said secondary winding for applying an output voltage to a load, said method comprising the steps of:
switching current flow through LC circuit at a switching frequency which is lower than said resonant frequency in such a manner that current is permitted to flow through said LC circuit only in a single direction during each half cycle of said switching frequency;
applying a DC voltage of appropriate polarity to said LC circuit during a portion of each half cyle of said switching frequency, the polarity of said DC voltage being reversed for each successive half cycle of said switching frequency so as to aid the current flow through said LC circuit; and
adjusting the portion of each said half cycle during which the DC voltage is applied to said LC circuit so as to adjust the output voltage applied to said load.

20. The method of claim 19, wherein the portion of each half cycle during which said DC voltage is applied to said LC circuit is adjusted in such a manner to maintain the output voltage applied to said load at a constant value.

21. The method of claim 19, wherein said DC voltage is of constant magnitude and is applied to said LC circuit as a voltage pulse, the duration and position of said voltage pulse being adjusted with respect to said switching frequency so as to adjust the output voltage applied to said load.

22. The method of claim 19, wherein said DC voltage is applied to said LC circuit for less than the entire duration of each half cycle of said switching frequency.

23. The method of claim 19, wherein said capacitor includes both straight capacitance in said primary winding and a reflected capacitance which is reflected to said primary winding from said secondary winding.

24. The method of claim 19 wherein energy is transferred from said LC circuit to said output load only when the voltage across said capacitor is greater than a value determined by the output voltage across said output load.

25. The method of claim 1, wherein energy is transferred to said capacitor during that portion of each half-cycle of said switching frequency during which energy is not being transferred to said output load.

* * * * *